(12) United States Patent
Chung et al.

(10) Patent No.: US 8,406,625 B2
(45) Date of Patent: Mar. 26, 2013

(54) APPARATUS AND METHOD FOR CROSS-CONNECTING OPTICAL PATH IN WAVELENGTH DIVISION MULTIPLEXING SYSTEM

(75) Inventors: Hwan-seok Chung, Daejeon-si (KR);
Sun-hyok Chang, Daejeon-si (KR);
Sang-soo Lee, Daejeon-si (KR);
Kwang-joon Kim, Daejeon-si (KR)

(73) Assignee: Electronics and Telecommunications Research Institute (KR)

( * ) Notice: Subject to any disclaimer, the term of this patent is extended or adjusted under 35 U.S.C. 154(b) by 772 days.

(21) Appl. No.: 12/486,642

(22) Filed: Jun. 17, 2009

(65) Prior Publication Data
US 2010/0092172 A1 Apr. 15, 2010

(30) Foreign Application Priority Data
Oct. 10, 2008 (KR) .................. 10-2008-0099697

(51) Int. Cl.
*H04J 14/00* (2006.01)
(52) U.S. Cl. ............... 398/50; 398/45; 398/56
(58) Field of Classification Search ........... 398/45, 398/50, 51, 54, 56
See application file for complete search history.

(56) References Cited

U.S. PATENT DOCUMENTS

| | | | |
|---|---|---|---|
| 5,739,935 A | 4/1998 | Sabella | |
| 6,647,208 B1 * | 11/2003 | Kirby | 398/45 |
| 6,768,827 B2 * | 7/2004 | Yoo | 385/14 |
| 7,079,723 B2 | 7/2006 | Bortolini et al. | |
| 7,272,310 B2 * | 9/2007 | Maciocco et al. | 398/47 |
| 7,324,752 B2 * | 1/2008 | Handelman | 398/65 |
| 2007/0196106 A1 | 8/2007 | Eiselt | |

FOREIGN PATENT DOCUMENTS

| | | |
|---|---|---|
| KR | 10-2004-0045139 | 6/2004 |
| WO | WO 97/18685 | 5/1997 |
| WO | WO 2008060007 A1 * | 5/2008 |

* cited by examiner

*Primary Examiner* — M. R. Sedighian
(74) *Attorney, Agent, or Firm* — Blakely, Sokoloff, Taylor & Zafman

(57) ABSTRACT

Provided is an optical network in which a wavelength division multiplexing-based optical transmission scheme is implemented. An apparatus for cross-connecting an optical path includes a path switch including a plurality of input terminals receiving optical signals from other nodes, and a plurality of output terminals sending the optical signals to the other nodes, the path switch switching the path of the optical signal so that the optical signal input via one of the input terminals is output to one of the output terminals; and a wavelength converter converting a wavelength of the optical signal input via the input terminal and outputting the wavelength-converted optical signal to the output terminal according to a switching result of the path switch. Thus, inefficient use of a network resource due to wavelength collision can be prevented, the path can be automatically cross-connected and thus quickly established, path switching and branch combination can be performed irrespective of wavelength, and switching can be performed irrespective of direction.

9 Claims, 9 Drawing Sheets

APPARATUS AND METHOD FOR CROSS-CONNECTING OPTICAL PATH IN WAVELENGTH DIVISION MULTIPLEXING SYSTEM

CROSS-REFERENCE TO RELATED APPLICATION

This application claims the benefit under 35 U.S.C. §119 (a) of Korean Patent Application No. 10-2008-99697, filed on Oct. 10, 2008, the disclosure of which is incorporated herein in its entirety by reference.

BACKGROUND

1. Field

The following description relates to an optical network in which a wavelength division multiplexing-based optical transmission scheme is implemented, and more particularly, to a path cross-connection scheme for each node in an optical network.

2. Description of the Related Art

A wavelength division multiplexing (WDM)-based optical transmission system that multiplexes optical signals having a plurality of wavelengths in one optical fiber and transmits a resultant signal is developing from a point to point, static network structure that transmits signals via a fixed line to a ring network structure in which a network can be dynamically re-configured, if necessary, or to a mesh network structure. As transmission capacity increases in an optical/electrical/optical (O/E/O) path cross-connector in which each node in a network electrically converts all information and electrically processes resultant information, electrical information processing causes a bottleneck phenomenon and the cost of electrical information processing increases in proportion to transmission capacity.

SUMMARY

The following description relates to a wavelength-independent apparatus and method for cross-connecting an optical path that alleviate the need to set a wavelength of an optical signal in advance in branching/combining the optical signal to a local network in each network node of a wavelength division multiplexing system.

The following description also relates to an apparatus and method for cross-connecting an optical path that are capable of path switching and branch combination irrespective of wavelength, and switching irrespective of direction, in using a wavelength division multiplexed signal.

According to an exemplary aspect, there is provided an apparatus for cross-connecting an optical path in each node of a wavelength division multiplexing system, the apparatus including a path switch including a plurality of input terminals receiving optical signals from other nodes, and a plurality of output terminals sending the optical signals to the other nodes, the path switch switching the path of the optical signal so that the optical signal input via one of the input terminals is output to one of the output terminals, and a wavelength converter converting a wavelength of the optical signal input via the input terminal and outputting the wavelength-converted optical signal to the output terminal according to a switching result of the path switch.

According to another exemplary aspect, there is provided a method for cross-connecting an optical path in each node of a wavelength division multiplexing system, the method including receiving an optical signal from another node, converting a wavelength of the received optical signal, and outputting the wavelength-converted signal to the other node via an output terminal selected according to a path cross-connection control signal from a network control device.

When an optical signal directed from node A to node C via node B uses a wavelength $\lambda_1$, a signal to be directed from node D to node C via node B must use a different wavelength, except for a section between node D and node B, since the wavelength $\lambda_1$ is used between node B and node C.

When numbers of nodes and sections through which an optical signal passes increase, it is difficult to obtain a wavelength available in all sections when a wavelength available in some sections is used in other sections.

Accordingly, when all wavelengths provided in a section are unavailable, this leads to waste of a network resource.

However, when node B is capable of converting a signal wavelength, a connection can be made between node B and node C by node B converting a signal from the wavelength $\lambda_1$ into a wavelength $\lambda_2$. Obtaining a signal wavelength available in one section is more useful than obtaining a signal wavelength available all sections.

That is, according to the present invention, input/output ports are automatically selected without manually dispatching an optical fiber in establishing a path between nodes, such that the path can be automatically cross-connected and thus quickly established.

Also, wavelength-independent branch/combination is feasible without needing to separately set a wavelength in branching/combining a signal to a local network.

Moreover, a path cross-connection system capable of wavelength conversion is built such that network resource efficiency degradation due to wavelength collision can be prevented, path switching and branch combination for an optical signal are feasible without restriction to a specific wavelength, and an input optical signal can be connected to other nodes or local networks irrespective of direction.

Other features will become apparent to those skilled in the art from the following detailed description, which, taken in conjunction with the attached drawings, discloses exemplary embodiments of the invention.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain aspects of the invention.

DETAILED DESCRIPTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Figure 1:
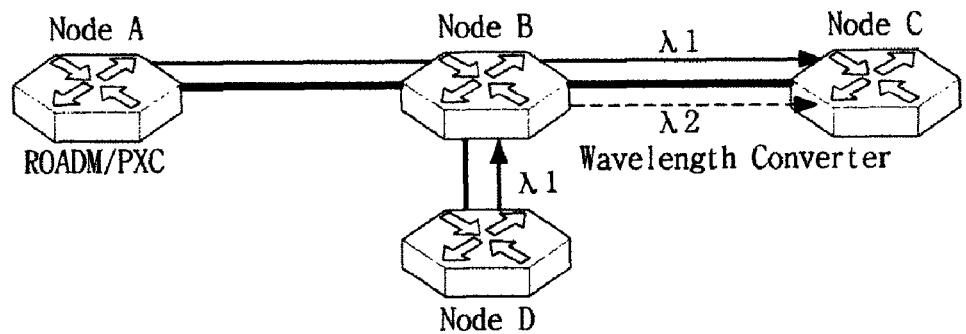
FIG. 1 illustrates a wavelength conversion function in a wavelength division multiplexing scheme.
Figure 2:
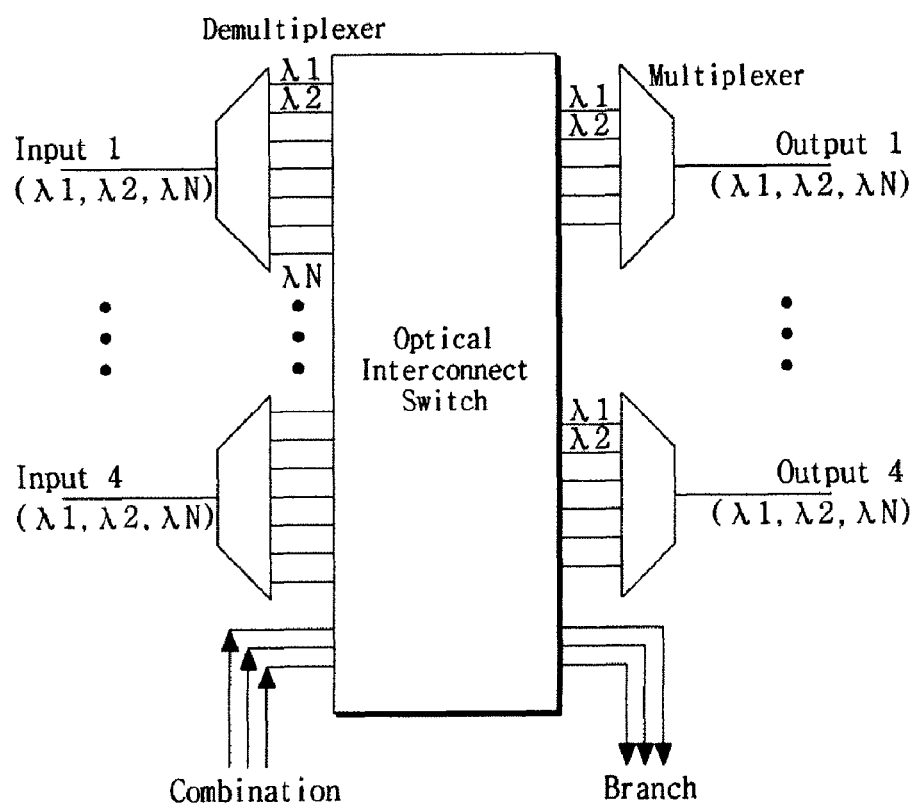
FIG. 2 illustrates a path cross-connection system using arrayed waveguide grating demultiplexers.

FIG. 2 illustrates a path cross-connection system using arrayed waveguide grating (AWG) demultiplexers. The path cross-connection system includes demultiplexers, an optical interconnect switch, and arrayed waveguide grating multiplexers. The path cross-connection system using arrayed waveguide grating demultiplexers has a simple structure since it uses only optical switching without electrical conversion. However, an attenuated signal cannot be reproduced and availability of a network resource is reduced due to wavelength collision caused by absence of a wavelength conversion function. That is, since all signals are divided based on wavelength and switched in network nodes, an optical signal is attenuated due to an AWG filtering phenomenon generally used for multiplexing/demultiplexing.

Figure 3:
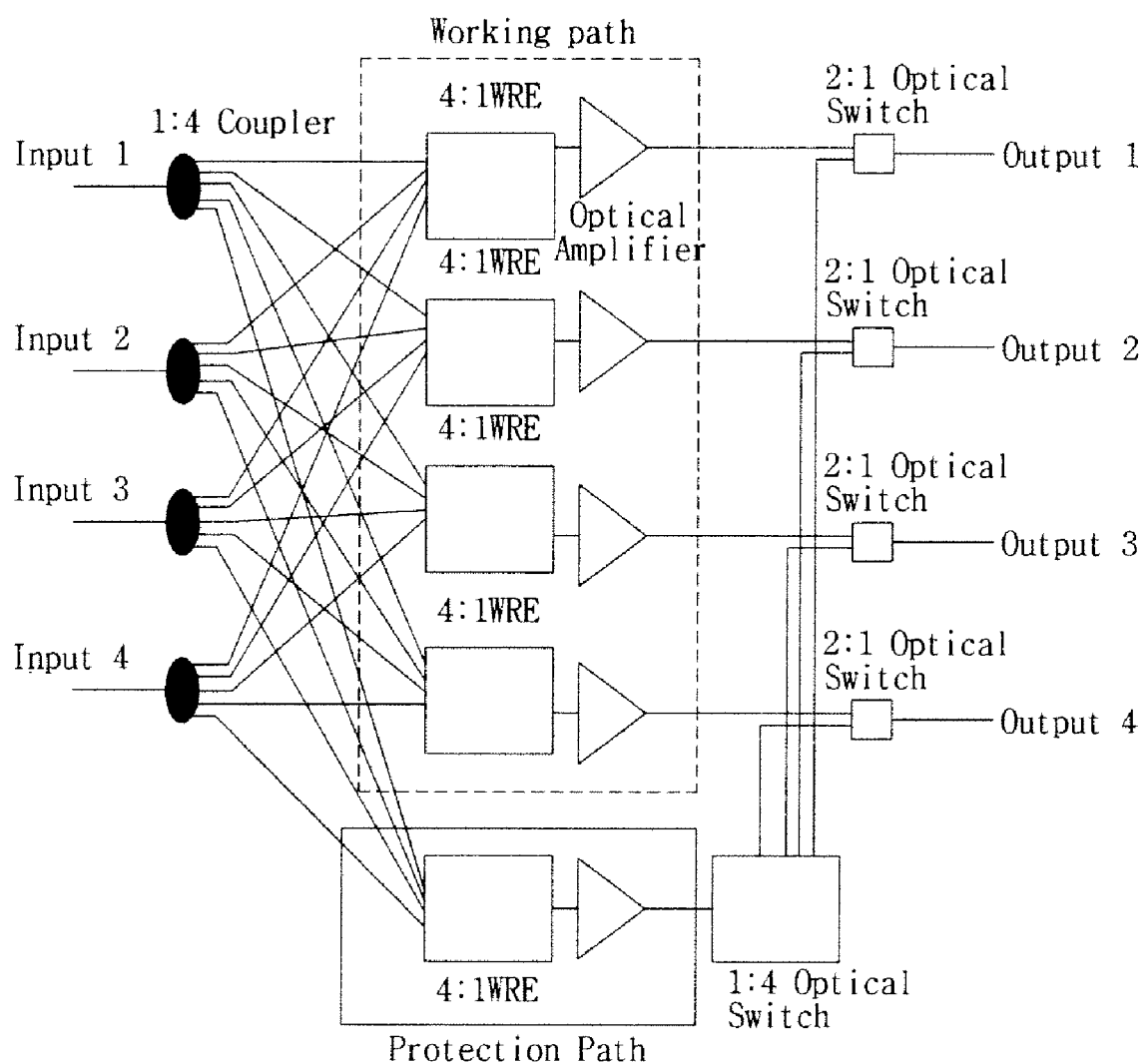
FIG. 3 illustrates a path cross-connection system using a coupler and a wavelength routing element.

FIG. 3 illustrates a path cross-connection system using couplers and wavelength routing elements (WREs). As shown in FIG. 3, the path cross-connection system has a structure in which an input signal is input to the respective wavelength routing elements using the couplers and the wavelength routing elements output desired wavelengths. The path cross-connection system requires a separate protection path for coping with malfunction of the wavelength routing elements. Since this structure has no wavelength conversion function, efficient use of the network resource is limited.

Figure 4:
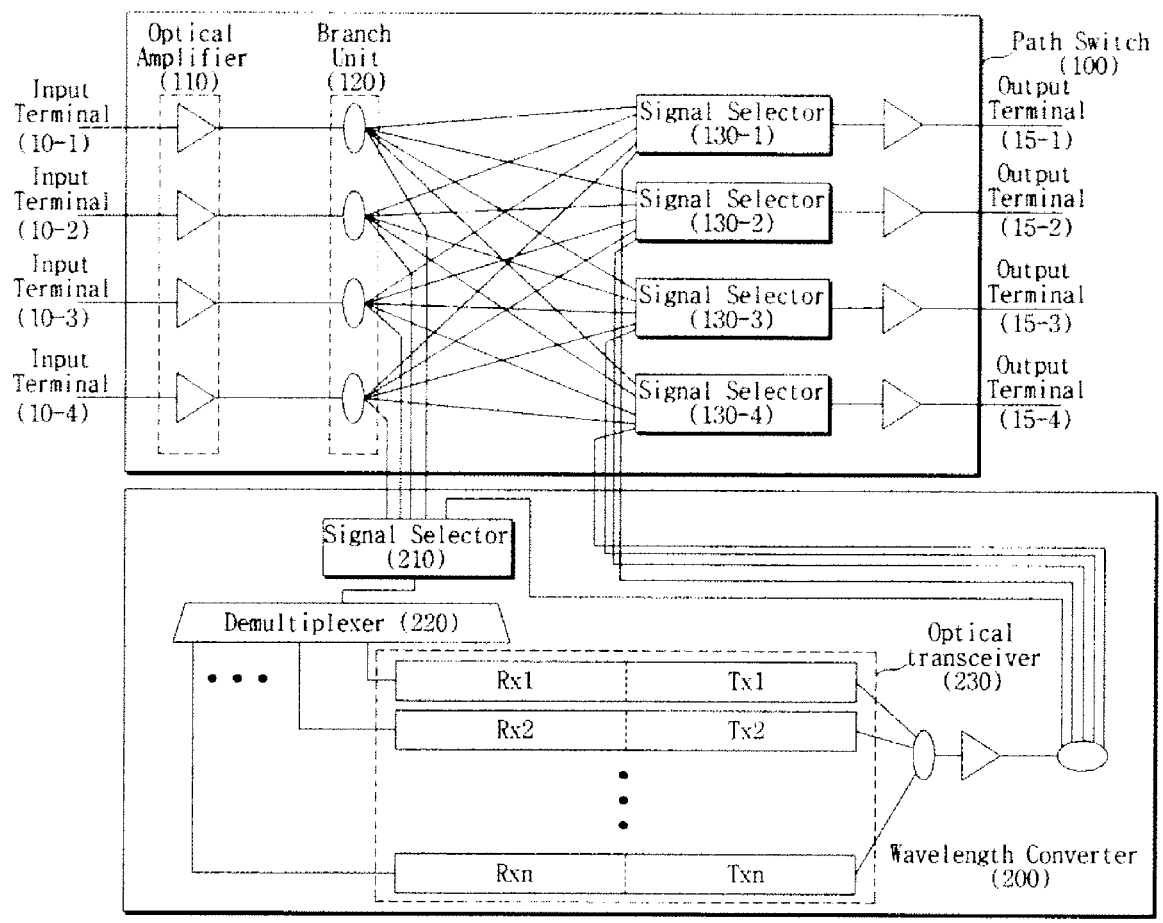
FIG. 4 is a block diagram illustrating an apparatus for cross-connecting an optical path according to an exemplary embodiment.

FIG. 4 is a block diagram illustrating an apparatus for cross-connecting an optical path according to an exemplary embodiment.

Referring to FIG. 4, the apparatus for cross-connecting an optical path includes a path switch 100 and a wavelength converter 200.

The path switch 100 includes a plurality of input terminals 10-1, 10-2, 10-3, and 10-4 for receiving signals from other nodes, and a plurality of output terminals 15-1, 15-2, 15-3, and 15-4 for sending signals to other nodes. The path switch 100 switches the path so that an optical signal received via one of the input terminals is output to one of the output terminals.

The path switch 100 further includes an optical amplifier 110, a branch unit 120, and signal selectors 130-1, 130-2, 130-3, and 130-4.

For example, a wavelength division multiplexed WDM signal input via the input terminal 10-1 is amplified by the optical amplifier 110. The branch unit 120 performs a branch into five paths. In this case, the branch unit 120 may be a optical coupler but is not limited thereto.

Here, the optical amplifier 110 and the branch unit 120 may be included for each of the plurality of input terminals 10-1, 10-2, 10-3, and 10-4, as shown in FIG. 4.

Among signals from the branch unit 120, four signals are connected to the signal selectors 130-1, 130-2, 130-3, and 130-4, respectively. The other signal is connected to the wavelength converter 200. Here, WDM signals input via the other input terminals 10-2, 10-3, and 10-4 are also branched and connected to the signal selectors 130-1, 130-2, 130-3, and 130-4 and the wavelength converter 200, like the WDM signal input via the input terminal 10-1.

In this case, the same ports, i.e., the input terminal 10-1 and the output terminal 15-1, may be implemented not to be connected to each other.

The signal selectors 130-1, 130-2, 130-3, and 130-4 select one of a plurality of input wavelength signals and output it to the respective output terminals 15-1, 15-2, 15-3, and 15-4. In this case, the signal selectors 130-1, 130-2, 130-3, and 130-4 select a signal to be output to the output terminals in response to a control signal input from a network control device.

The wavelength converter 200 converts a wavelength of an optical signal input via an input terminal and outputs a resultant signal to an output terminal according to a switching result of the path switch 100. Specifically, the wavelength converter 200 includes a signal selector 210 for selecting at least one of wavelength signals input via the plurality of input terminals 10-1, 10-2, 10-3, and 10-4 of the path switch 100; and an optical transceiver 230 for converting the selected wavelength signal into an electrical signal and converting the electrical signal into an optical signal, the wavelength of which can be converted.

The signal selector 210 of the wavelength converter 200 receives the signals input via the plurality of input terminals 10-1, 10-2, 10-3, and 10-4 and branched by the branch unit 120. In this case, the signal selector 210 may be a wavelength selective switch. The signal selector 210 may select a signal having any wavelength input via the plurality of input terminals 10-1, 10-2, 10-3, and 10-4. For example, the signal selector 210 may output a signal having a wavelength $\lambda_1$ from the signal input via the input terminal 10-1, and a signal having a wavelength $\lambda_2$ from the signal input via the input terminal 10-2. Alternatively, the signal selector 210 may output a signal having a wavelength $\lambda_2$ from the signal input via the input terminal 10-1 and a signal having a wavelength $\lambda_1$ from the signal input via the input terminal 10-2. That is, since the signal selector 210 of the wavelength converter 200 can select a signal having any wavelength for branch to a local network, it eliminates the need to set a wavelength of the branched signal in advance. In other words, a wavelength-independent system can be implemented.

A signal selected by the signal selector 210 of the wavelength converter 200, i.e., a signal branched to the local network, is divided according to wavelength by the demultiplexer 220. In this case, the demultiplexer 220 may be implemented by an AWG or wavelength selective switch. However, the demultiplexer 220 is not limited thereto and other implementations are possible.

The optical transceiver 230 includes optical receivers Rx1, Rx2, . . . , RxN converting an optical signal into an electrical signal, and optical transmitters Tx1, Tx2, . . . , TxN converting the electrical signal into an optical signal of variable wavelength.

Respective wavelength signals divided by the demultiplexer 220 are connected to such different optical receivers. Each optical receiver converts an optical signal having a specific wavelength into an electrical signal. This signal is connected to the optical transmitter, whose output wavelength may be changed to any wavelength.

That is, even though a wavelength of a signal input to the optical receiver is $\lambda_1$, wavelengths of an output signal of the optical transmitter may be $\lambda_2, \lambda_3, \lambda_4, \ldots, \lambda_N$. Signals having converted wavelengths from the optical transmitters are combined into one signal by an optical coupling unit. In this case, the optical coupling unit may be a optical coupler. The signal from the optical coupling unit is amplified by an optical amplifier, branched back by an optical branch unit, and connected to the signal selectors 130-1, 130-2, 130-3, and 130-4. In this case, the signal may not be connected to the signal selector 210 of the wavelength converter 200 intended for transmission to local networks.

That is, the signal input to the signal selector 210 of the wavelength converter 200 may be converted into a signal having any wavelength irrespective of an input terminal via which the input signal is input.

Figure 5:
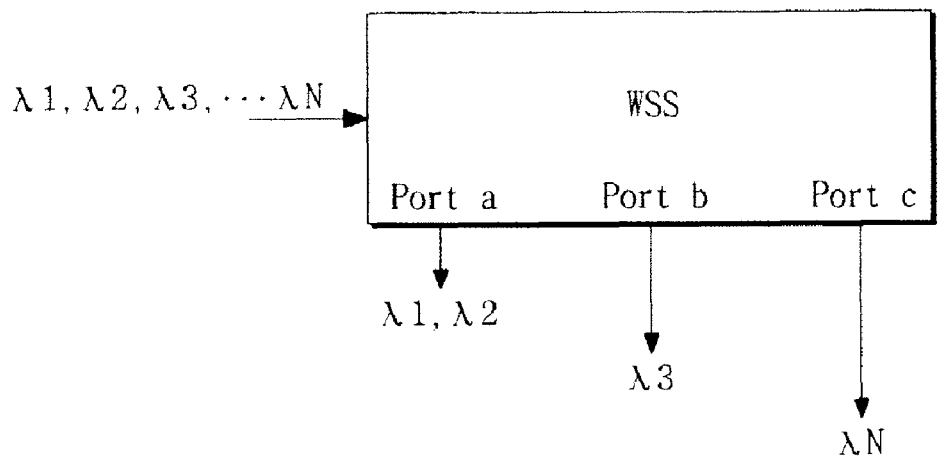
FIGS. 5 and 6 illustrate operation of a wavelength selective switch.
Figure 6:
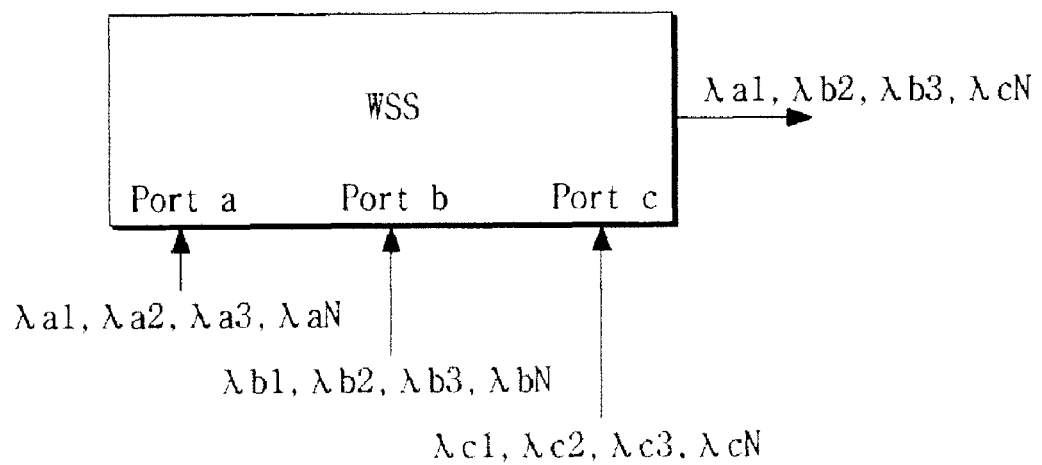

FIGS. 5 and 6 illustrate operation of the signal selector, i.e., a wavelength selective switch. As shown in FIG. 5, the wavelength selective switch (WSS) may switch any wavelength input via one input port to a plurality of output ports Port a, Port b, and Port c. For example, when signals having wavelengths $\lambda_1, \lambda_2, \lambda_3, \ldots \lambda_N$ are input via the input port, the wavelength selective switch may output the signal having wavelengths $\lambda_1$ and $\lambda_2$ to Port a, the signal having a wavelength $\lambda_3$ to Port b, and the signal having a wavelength $\lambda_N$ to Port c, and may block other channels.

Meanwhile, as shown in FIG. 6, the wavelength selective switch (WSS) may output a signal having a specific wavelength among signals having a plurality of wavelengths input via a plurality of input ports to one output port. For example, when signals having wavelengths $\lambda_{a1} \ldots \lambda_{aN}, \lambda_{b1} \ldots \lambda_{bN}$, and $\lambda_{c3} \ldots \lambda_{cN}$ are input to input ports Port a, Port b, and Port c, respectively, the wavelength selective switch selects only the signal having a wavelength $\lambda_{a1}$ input via Port a, the signal having wavelengths $\lambda_{b2}$ and $\lambda_{b3}$ input via Port b, or the signal having a wavelength $\lambda_N$ input via Port c, and then outputs it to the output port and blocks output of non-selected wavelength signals.

Also, amplitudes of signals input to the plurality of input ports can be adjusted based on wavelength. In this case, the wavelength selective switch selects or blocks signals in response to a command for overall control of the network from a path cross-connection control system.

Figure 7:
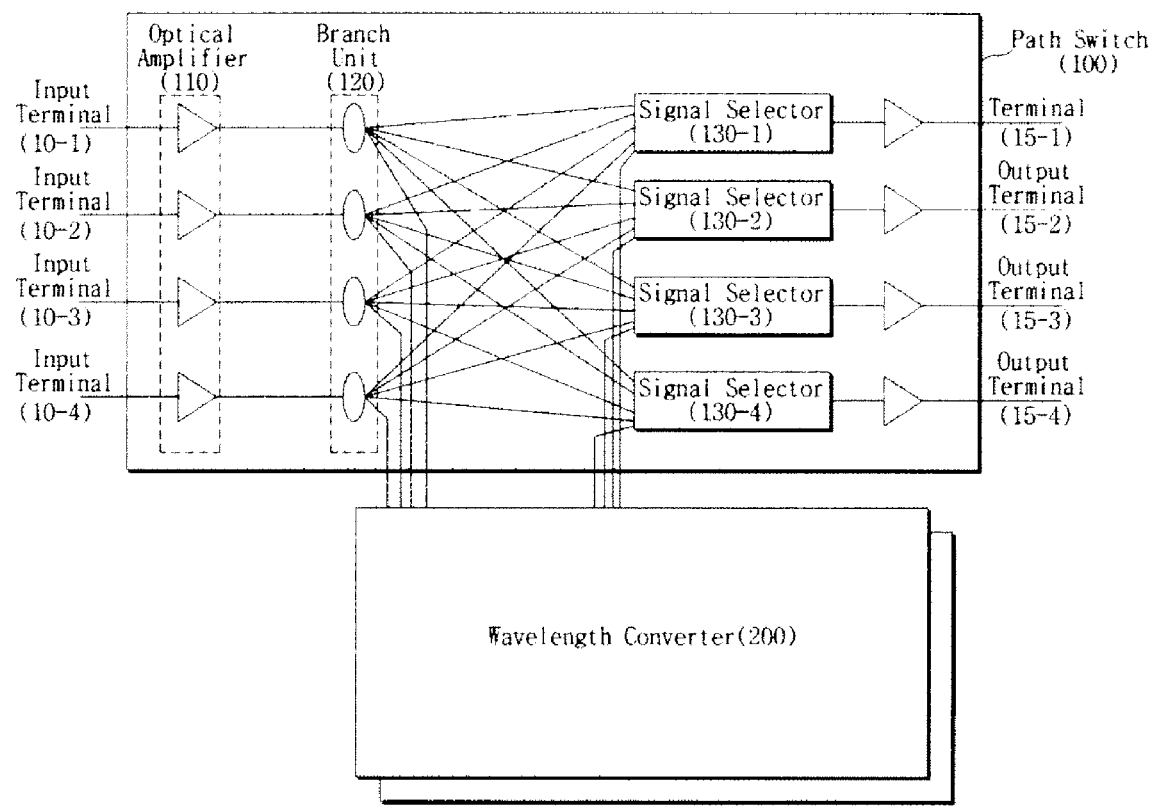
FIGS. 7 to 10 are block diagrams illustrating an apparatus for cross-connecting an optical path according to other exemplary embodiments.

FIG. 7 is a block diagram illustrating an apparatus for cross-connecting an optical path according to another exemplary embodiment.

Referring to FIG. 7, the apparatus may include a plurality of wavelength converters 200. In fact, the wavelength converters 200 are implemented by local network interfaces. That is, the wavelength converters 200 may be connected to a plurality of local networks and may branch an optical signal input via an input terminal and send resultant signals to the local networks, or combine optical signals input from the local networks and output a resultant signal to an output terminal. In this case, the plurality of wavelength converters 200, i.e., local network interfaces, allow numbers of branch/combined signals and wavelength-converted signals to be easily increased.

Figure 8:
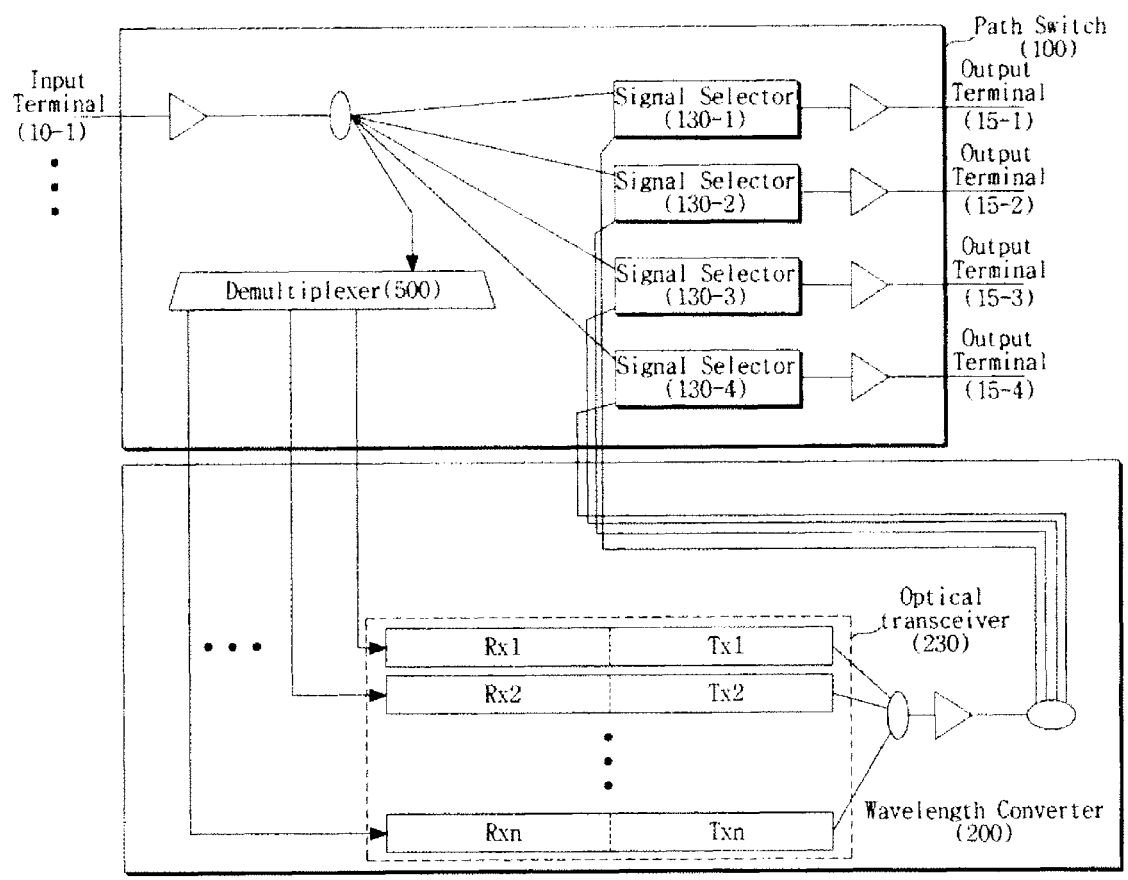
Figure 9:
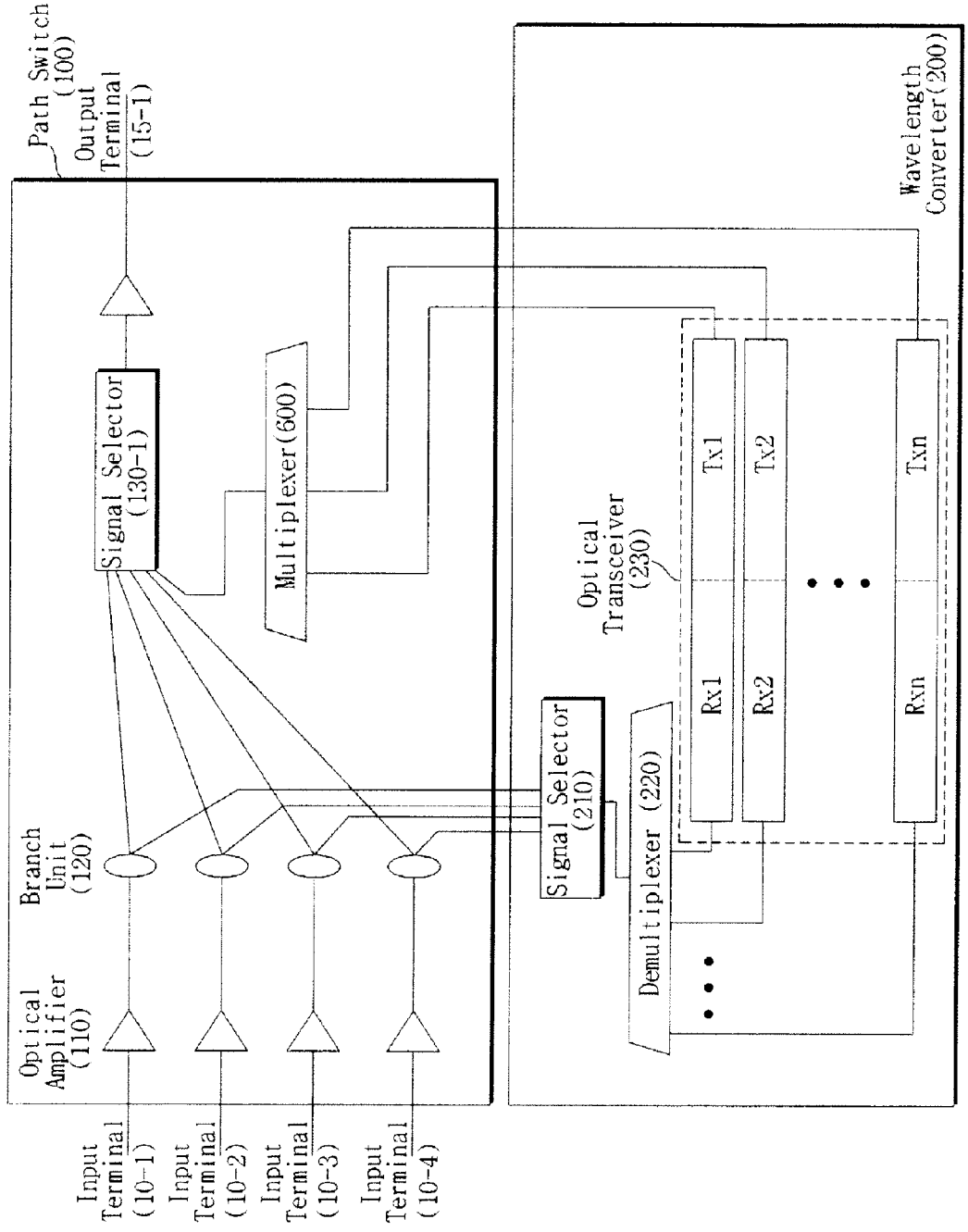

FIGS. 8 and 9 are block diagrams illustrating apparatuses for cross-connecting an optical path according to another exemplary embodiment.

Referring to FIG. 8, a path switch 100 according to an exemplary embodiment further includes a demultiplexer 500 for dividing a signal input via an input terminal and branched by a branch unit 120, based on wavelength, and outputting resultant signals to different optical transceivers 230 of a wavelength converter 200. In this case, the demultiplexer 500 may be an arrayed waveguide grating (AWG) but is not limited thereto.

As shown in FIG. 9, a path switch 100 may further include one multiplexer 600 for combining signals having a plurality of wavelengths input from at least one optical transceiver of a wavelength converter 200 and sending a resultant signal to an output terminal. In this case, the wavelength converter 200 may send the resulting signal to signal selectors 130-1, 130-2, 130-3, and 130-4 prior to directly sending the resultant signal to an output terminal. This allows for an increased branch number in the path switch 100, thereby providing a connection structure capable of interfacing with the local networks in addition to wavelength conversion.

Figure 10:
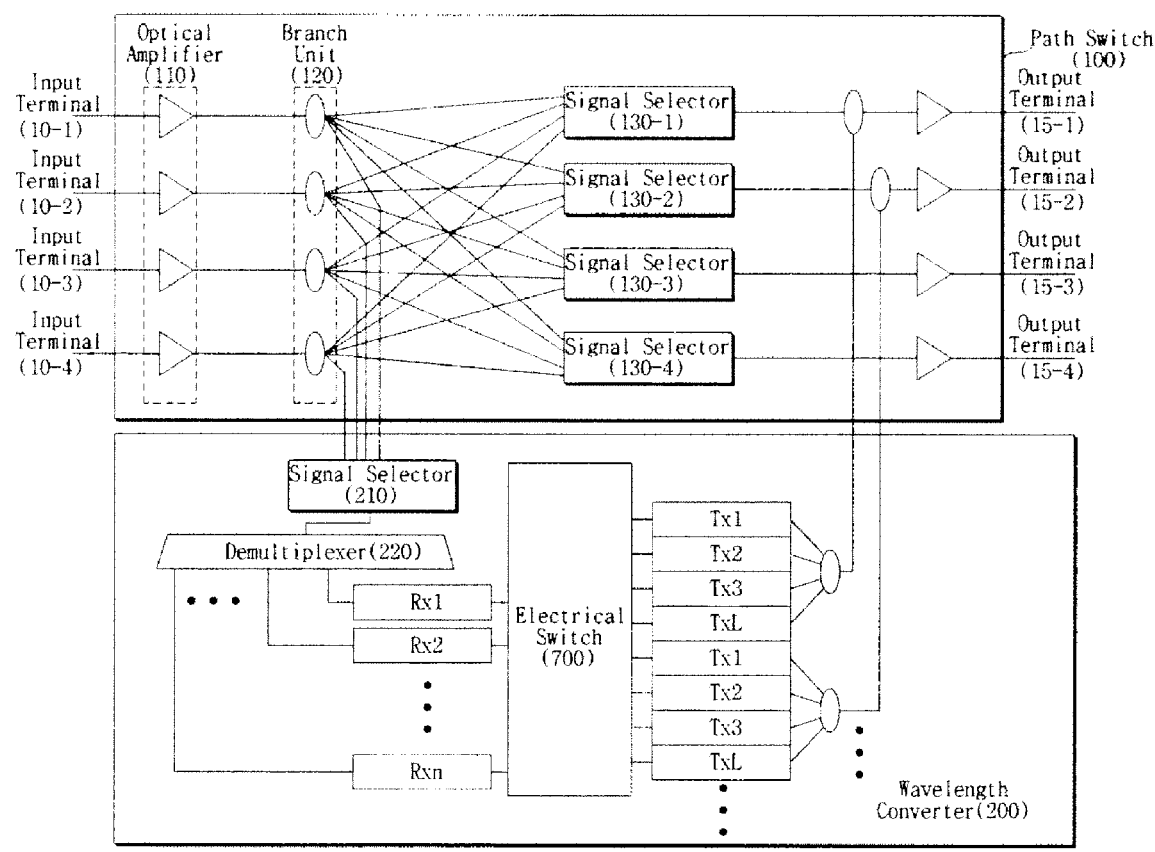

FIG. 10 is a block diagram illustrating an apparatus for cross-connecting an optical path according to another exemplary embodiment. As shown in FIG. 10 an optical transceiver includes a plurality of optical transmitters Tx1, Tx2, ..., TxL converting an optical signal into an electrical signal, and a plurality of optical receivers Rx1, Rx2, ..., Rxn converting the electrical signal into an optical signal of variable wavelength. The apparatus for cross-connecting an optical path further includes an electrical switch 70 switching a connection between the optical transmitters and the optical receivers.

In this case, optical signals output from optical receivers Rx1, Rx2, ..., Rxn of the wavelength converter 200 are multiplexed, for example, through a optical coupler. The multiplexed signal is output to the path switch 100.

Specifically, signals input via input terminals 10-1, 10-2, 10-3, and 10-4 are branched by a branch unit 120. Some signals from the branch unit 120 are sent to a signal selector 210 of the wavelength converter 200. In this case, the signal selector 210 may select and output one of signals having any wavelength input via any of the input terminals 10-1, 10-2, 10-3, and 10-4. The signal selected by the signal selector 210 is divided based on wavelength by a demultiplexer 220. The divided signals are input to the optical receivers Rx1, Rx2, ..., Rxn. The optical receivers Rx1, Rx2, ..., Rxn convert the input optical signals into electrical signals. The electrical switch 700 switches the path so that the electrical signals from the optical receiver are connected to the corresponding optical transmitters Tx1, Tx2, ..., TxL according to output direction. In this case, the path is switched to the optical transmitter connected to the output terminal according to the information from output terminals 15-1, 15-2, 15-3, and 15-4 as a result of wavelength conversion. The optical transmitters Tx1, Tx2, ..., TxL then convert the input electrical signals into optical signals of variable output wavelength.

The optical signals output from the optical transmitters are combined by an optical coupling unit, such as a optical coupler, and connected in each direction by couplers located at output terminals of signal selectors of the path switch 100. In this case, the optical signals may be amplified by optical amplifiers and output to the output terminals 15-1, 15-2, 15-3, and 15-4.

In the present exemplary embodiment, even though any signal is converted into a signal having a specific wavelength and connected to a specific output terminal by the optical transmitter, the optical transmitter may output an optical signal to another output terminal using the specific wavelength. Specifically, when a signal having a wavelength $\lambda_1$ from the input terminal 10-1 is passed through the signal selector 210 and the electrical switch 700 of the wavelength converter 200 and wavelength-converted into a signal having a wavelength $\lambda_1$ by the optical transmitter Tx1 connected to the output terminal 15-1, a signal having a wavelength $\lambda_3$ from the input terminal 10-2 may be passed through the signal selector 210 and the electrical switch 700 of the wavelength converter 200 and wavelength-converted into a signal having a wavelength $\lambda_2$ by the optical transmitter Tx2 connected to the output terminal 15-2. That is, the signal can be output to the different output terminals using the same wavelength, such that one wavelength can be used to deliver a signal via a variety of paths. That is, the network resource can be efficiently used.

Figure 11:
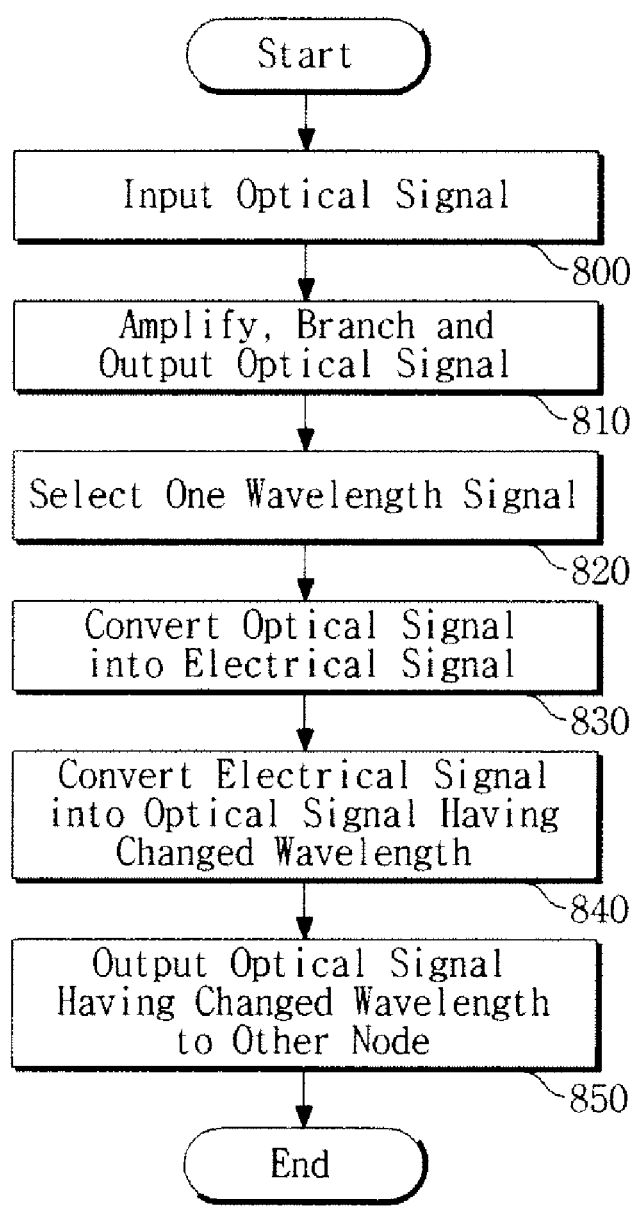
FIG. 11 is a flowchart illustrating a method for cross-connecting an optical path according to an exemplary embodiment.

FIG. 11 is a flowchart illustrating a method for cross-connecting an optical path according to an exemplary embodiment.

First, when a wavelength division multiplexed WDM-signal is input from the other node (S800), it is optically amplified and branched and output (S810). Some of the branched signals are connected to the wavelength selective switches connected to respective output terminals. The signals may be output to the output terminals according to the switching result of the wavelength selective switch. In response to the control signal input from the network control device, the wavelength selective switch selects a signal to be output to the output terminal.

Other branched optical signals are output to a local network interface for wavelength conversion. The optical signal branched and output to the local network interface is demultiplexed and divided based on wavelength. One of the resultant signals is selected (S820). The selected optical signal is converted into an electrical signal (S830). The electrical signal is then converted into an optical signal of variable wavelength (S840). The optical signal having the changed wavelength may be output to the other node (S850).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for cross-connecting an optical path in each node of a wavelength division multiplexing system, the apparatus comprising:
    a path switch including a plurality of input terminals receiving optical signals from other nodes, and a plurality of output terminals sending the optical signals to the other nodes, the path switch switching the path of the optical signal so that the optical signal input via one of the input terminals is output to one of the output terminals; and
    a wavelength converter converting a wavelength of the optical signal input via the input terminal and outputting the wavelength-converted optical signal to the output terminal according to a switching result of the path switch, wherein the wavelength converter comprises:
    a signal selector selecting at least one of wavelength signals received via the plurality of input terminals of the path switch; and
    at least one optical transceiver converting the selected wavelength signal into an electrical signal and converting the electrical signal into an optical signal of variable wavelength.

2. The apparatus of claim 1, wherein the path switch comprises:
    a branch unit connected to the plurality of input terminals, amplifying signals input via the input terminals, and branching and outputting the amplified signals; and
    at least one signal selector selecting at least one of a plurality of optical wavelength signals received from the branch unit, and outputting the selected signal via an output terminal connected to the signal selector.

3. The apparatus of claim 2, wherein the signal selector selects a wavelength signal in response to a path cross-connection control signal from a network control device.

4. The apparatus of claim 1, wherein the wavelength converter further comprises a demultiplexer dividing the signal selected by the signal selector according to a wavelength of the signal and outputting the divided signals to an optical transceiver corresponding to the wavelength of the signal.

5. The apparatus of claim 4, wherein the demultiplexer comprises an arrayed waveguide grating (AWG) or a wavelength selective switch.

6. The apparatus of claim 1, wherein the path switch further comprises a demultiplexer dividing a signal received via each input terminal according to a wavelength of the signal and outputting the divided signals to an optical transceiver corresponding to the wavelength of the signal.

7. The apparatus of claim 1, wherein the path switch further comprises a multiplexer combining wavelength signals received from at least one of the optical transceivers and sending the combined signal to the output terminal.

8. The apparatus of claim 1, wherein the optical transceiver comprises at least one optical transmitter converting an optical signal into an electrical signal, and at least one optical receiver converting the electrical signal into an optical signal of variable wavelength, the apparatus further comprising an electrical switch switching a connection between the optical transmitter and the optical receiver.

9. A method for cross-connecting an optical path in each node of a wavelength division multiplexing system, the method comprising:
    receiving an optical signal from another node;
    converting a wavelength of the received optical signal; and
    outputting the wavelength-converted signal to the other node via an output terminal selected according to a path cross-connection control signal from a network control device, further comprising:
    after receiving the optical signal, amplifying a plurality of optical signals received from the other nodes and branching and outputting the amplified optical signals; and
    selecting at least one of the output optical signals, wherein the converting of the wavelength of the received optical signal comprises converting a wavelength of the selected optical signal,
    wherein the converting of the wavelength of the received optical signal comprises:
    converting the selected optical signal into an electrical signal; and
    converting the electrical signal into an optical signal of variable wavelength.

* * * * *